Patented Apr. 28, 1925.

1,535,726

UNITED STATES PATENT OFFICE.

HENRY G. JAEGER, OF ROSE HILL, CALIFORNIA, ASSIGNOR OF ONE-FOURTH TO EVERETT R. LAMBERTSON AND ONE-FOURTH TO GEORGE P. CLEMENTS, BOTH OF EAGLE ROCK CITY, CALIFORNIA, AND ONE-FOURTH TO JULIUS SCHNEIDER, OF LOS ANGELES, CALIFORNIA.

PLASTIC COMPOSITION AND PROCESS.

No Drawing. Application filed Otcober 4, 1922. Serial No. 592,422.

*To all whom it may concern:*

Be it known that I, HENRY GEORGE JAEGER, a citizen of the United States, residing at Rose Hill, in the county of Los Angeles and State of California, have invented new and useful Improvements in a Plastic Composition and Process, of which the following is a specification.

This invention relates to a plastic composition for structural use and to processes used in the preparation and application of the same, a primary object of my present invention being the production of a plastic composition suitable for use in the manufacture of wallboard and for analogous structural uses, which compound can be economically prepared and used, and which although relatively inexpensive by reason of the high percentage of saw dust, shavings, or equivalent material therein, is also comparatively light in weight, fire-resistant and waterproof.

Another object of my invention is the production of a non-warping composition of the above general character which requires no application of heat or pressure during the process of molding or applying the same, air cells being permitted to remain in the product, especially when it is to be used for insulation against heat, sound or electricity.

A further object of my invention is the production of a composition of the general character indicated which shall undergo little or no shrinkage, distortion or deterioration as the result of atmospheric conditions or changes.

Another object of my invention is the production of a composition of the general character indicated which shall have superior cohesive qualities, enabling it to be easily molded and spread, the resulting products exhibiting such superior working qualities, including resiliency, tensile strength and resistance to fracture, as shall enable it to be satisfactorily worked by sawing, fitting and nailing in the general manner of lumber.

Another object of my invention is the production of a composition of the general character described which is suitable for use in repair work, and easily admits of being repaired, and which is also favorable to the application of coloring matters, especially such coloring matters as are not unfavorably affected by contact with lime or other alkalies.

Other objects and advantages of my invention will appear from the following detailed description and the appended claims, in connection with which it will be understood that I am aware that many of the ingredients preferred by me have heretofore been used in plastic compositions, my invention being in some measure dependent upon the materials used but also upon their respective proportions and upon the manner in which they are associated to produce the superior and durable product to which my invention is directed.

With the foregoing and other objects in view, my invention, which may obviously be modified in various respects by those skilled in the art and within the scope of the appended claims, consists in the composition of matter and method of preparing and using the same of which I now proceed to give a detailed example.

In the preferred embodiment of my present invention, I first prepare a filling material by taking about seven parts by volume of a dry organic material such as fine wood shavings or coarse saw dust and condition the same by moistening with a 12% solution of magnesium chloride this being a well-known chlorid of an alkaline earth metal and permitting the material to drain without becoming dry. After the excess moisture has been permitted to drip off I mix therewith about one part of finely calcined magnesite, so that each particle of the organic material is covered thereby. Thereafter or previously I separately mix about one part of the finely powdered calcined magnesite with about one part of finely powdered silica, which may be obtained by passing pulverized silica rock or silica sand through a sifter having two hundred meshes to the inch. I then prefer to mix the organic material as conditioned above with the last mentioned mixture of powders and to add thereto a sufficient quantity of a 22° Bé. solution of magnesium chloride to form a plastic mass of the desired consistency for molding.

The plastic material prepared as above described may be spread upon a surface, whether vertical or horizontal, where it is permanently to remain, or it may be formed in slabs upon any smooth surface, from which it may be removed after drying to be sold and used in the manner of wallboard, the product becoming hard and acquiring the advantageous characters above set forth. While an exact knowledge of the chemical reaction by which my product acquires its properties is not believed to be material, I may state in passing that I believe the silica employed to be partially or fully dissolved in the chloride solution and that the resulting crystallization involves both the magnesite and the silica in a new chemical union, the organic material being enclosed and supported thereby, and air spaces being left throughout the product by reason of the avoidance of pressure during the formation thereof.

I claim is:

1. A plastic composition formed by saturating about seven parts by volume of a dry organic material with a solution of magnesium chloride, draining the same, mixing therewith about one part of calcined magnesite, separately mixing about one part of finely powdered silica with approximately an equal bulk of calcined magnesite, incorporating the last mentioned mixture with the mixture previously made, and adding to the resultant mixture sufficient of a solution of magnesium chloride to render the product plastic.

2. A process of preparing a plastic composition and products therefrom which comprises conditioning a filling material by the addition thereto of a solution of magnesium chloride, adding calcined magnesite thereto, preparing separately a mixture of finely powdered silica and calcined magnesite in about equal proportions, mixing about seven parts of the filling material so conditioned with about two parts of the last mentioned mixture, adding to the whole a solution of magnesium chloride, and permitting the formed product to dry without the application of heat or pressure.

In testimony whereof I have signed my name to this specification.

H. G. JAEGER.